United States Patent Office 3,654,271
Patented Apr. 4, 1972

3,654,271
PROCESS FOR PREPARING SIMPLE AND SUBSTITUTED MORPHOLINES
Arthur Lamendin, Bernard Matel, and Jean Dhenin, Bethune, France, assignors to Societe de Produits Chimiques Marles-Kuhlmann, Paris, France
No Drawing. Filed Apr. 25, 1969, Ser. No. 819,471
Claims priority, application France, Apr. 26, 1968, 149,680
Int. Cl. C07d 87/26
U.S. Cl. 260—247
10 Claims

ABSTRACT OF THE DISCLOSURE

The present invention concerns a new process for preparing simple or substituted morpholines by dehydration of amino-alcohols chlorohydrates.

BACKGROUND OF THE INVENTION

Substituted or unsubstituted morpholines have previously been prepared by ring formation (cyclization) of amino-alcohols by reaction in the vapor phase at temperatures between 250° and 550° in the presence of dehydration catalysts such as alumina, chromium or iron oxides, metallic salts of phosphoric acid, etc., generally either under or above the atmospheric pressure. These processes however undergo the subjection to solid catalysts which must be more or less quickly regenerated or replaced, and the yields produced are only fair.

SUMMARY OF THE INVENTION

This invention involves essentially a two stage process comprising the ring formation (cyclization) of an amino-alcohol chlorohydrate having the general formula:

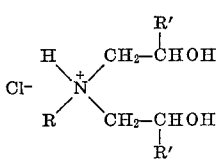

wherein R is a hydrogen atom, a methyl, ethyl, butyl, hydroxy ethyl or phenyl group and R' is a hydrogen atom or a methyl group by means of heating in the presence of water and hydrochloric acid, and in obtaining the morpholine chlorohydrate.

In a second stage the process involves the reaction of a morpholine chlorohydrate with an appropriate amount of the corresponding amino-alcohol in order to form a new amino-alcohol chlorohydrate. The morpholine compound thus produced can be obtained and isolated therefrom advantageously by distillation. The new amino-alcohol chlorohydrate formed during the second stage reaction can then be recycled to the first stage.

The reaction of the first stage may be schematized as follows:

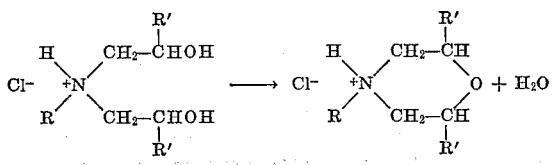

and the reaction of the second stage may be schematized as follows:

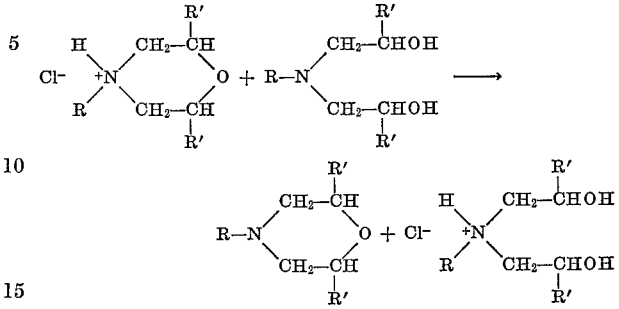

The amino-alcohol chlorohydrate which is the basic raw substance or starting material generally results from the recycling of this product obtained during the second stage.

In the beginning of the process the amino-alcohol chlorohydrate can be prepared by reacting the amino-alcohol with a stoichiometric amount of commercially hydrochloric acid at 22° Bé. Slightly less than a stoichiometric amount of hydrochloric acid can be used for non-substituted chlorohydrates or amino-alcohols. In carrying out the reactions it is preferred to maintain the temperature below about 60° C. The water can be removed by distillation of the crude product at about 125° C. under 20 mm. Hg.

The ring formation or cyclization of the first stage is advantageously carried out using between about 0.5% and 3% by weight of hydrochloric acid and between about 4.5% and 8% by weight of water based on the weight of the chlorohydrate. The process is also advantageously carried out at a temperature between about 175° and 190° C. which of course will vary, depending upon other reaction conditions and particularly upon the amino-alcohol chlorohydrate being reacted.

The process is carried out at an atmospheric pressure and no advantageous results have been found by carrying out the process above atmospheric pressure. On the other hand, carrying out the reaction under a reduced or sub-atmospheric pressure, the reaction either does not take place or results in poor reaction rates and yields.

If desired, the process can be carried out in the presence of the usual known dehydration catalyst. The presence of such a catalyst is advantageous when the starting amino-alcohol is the diethanolamine or the diisopropanolamine since it causes a reduction in the formation of higher condensation products. Nevertheless, if no catalyst is used, and if care is taken to acidify the amino-alcohol chlorohydrate only when the dehydration reaction temperature is reached and if a flashing by water vapor at the end of the dehydration reaction, the formation of these higher condensation products is practically avoided.

In the second stage, the amount of amino-alcohol used is preferably that amount theoretically necessary to react with or displace all of the morpholine chlorohydrate.

The second stage of the process is advantageously carried out at a temperature from about 90 C. to 150° C. and under reduced or sub-atmospheric pressure from about 200 mm. to 10 mm. Hg.

The process according to the invention possesses many advantages. In the first stage the process can be operated at atmospheric pressure and at a relatively low temperature. The aqueous amino-alcohol chlorohydrate can readily solubilize with the minimum quantity of hydrochloric acid necessary to the reaction. The hydracid is not soluble at higher temperatures. The acidification at the dehydration reaction temperature lessens the formation of amino-alcohol chloro-chlorohydrate compounds and consequently, results in superior products particularly with the non-substituted morpholines. The flashing by passing water vapor into the reaction mixture at the end of the dehydration reaction produces hydrolysis of amino-alcohol chloro-chlorohydrate and the regeneration of the amino-alcohol chlorohydrate by getting rid of released hydrochloric acid, and the consequent elimination or reduction of the production of higher condensation products.

Many advantages are also obtained in the second stage of this process including the elimination of the use of alkali, the formation of salts therefrom and the drawbacks of recovering the amines from such an alkaline medium. The crude morpholine can be obtained with a percent above 90%. The rectification is so easy. The neutralization or displacement allows to obtain an amino-alcohol chlorohydrate ready to be dehydrated, thus avoiding successive preparations and concentration of amino-alcohol chlorohydrates and consumption of hydrochloric acid.

The overall process results in the production of excellent yields of 90% and more, and yields of 95% and more have been obtained in practicing the process of this invention for obtaining substituted morpholine.

DETAILED DESCRIPTION OF THE INVENTION

The following examples illustrate the process according to the invention:

EXAMPLE I.—CONTINUOUS PROCESS

In the process described below, the following ingredients were used in the percent by weight indicated.

| | By weight, percent |
|---|---|
| N-methyldiethanolamine chlorohydrate | 90.4 |
| N-methylmorpholine chlorohydrate | 1 |
| HCl (calculated pure) | 1.5 |
| Water | 7.1 |

A 1.8 liter capacity glass reaction vessel was equipped with a thermometer, an outlet tube and a cooling condenser extending upwardly from the reaction vessel. The reaction vessel was inserted into a heating liquid maintained at about 188–190° C. by means of an electrical heating resistance element. One liter of a mixture of the chlorohydrates mentioned above were first brought to a temperature of about 50° C. to lower the viscosity and then, fed at room temperature to the reaction vessel at the rate of 180 to 200 grams/hour. The ring formation or cyclization was continuously carried out. The acidulated water was collected at the end of the cooling condenser and the N-methyl morpholine chlorohydrate was collected at the outlet of the tube by adjustment of the temperature on the lateral wall to about 100° to 120° C. using suitable heating resistance element. For 100 grams of crude N-methyl diethanol chlorohydrate used, there was obtained:

| | G. |
|---|---|
| Crude N-methylmorpholine chlorohydrate | 88.7 |
| Water (at 3.6% HCl) | 10.5 |

The crude N-methyl morpholine chlorohydrate collected had the following composition:

| | By weight, percent |
|---|---|
| Pure N-methyl morpholine chlorohydrate | 59.6 |
| Untransformed N-methyl diethanolamine chlorohydrate | 35.6 |
| HCl (calculated pure) | 0.7 |
| Water | 4.0 |
| Impurities | 0.1 |

The second stage of the process, that is, the obtaining of the crude N-methyl morpholine by displacement of the chlorine, of the chlorohydrate by means of the corresponding amino-alcohol was carried out in a three necked 6 liter flask. 5,000 grams of the previously obtained N-methyl morpholine chlorohydrate were added to the flask. The flask was maintained at about 90° C. under a reduced pressure of 20 mm. Hg. 2,700 grams of methyl diethanol amine were continuously added to the flask. The flask was then heated to about 150° C. under a reduced pressure of about 10 mm. Hg. N-methyl morpholine distills at approximately 60° C. and at this temperature all of the N-methyl morpholine is distilled and recovered. The crude N-methyl morpholine totaled 2,390 grams containing 91.4% of N-methyl morpholine and 8.6% water.

The crude N-methyl morpholine recovered was then distilled in a distillation column equipped with small rings equivalent to 12 theoretical plates resulting in the recovery at 95° C. of 980 grams of N-methyl morpholine water azeotrope containing 83% of N-methyl morpholine and 1,410 grams of pure N-methyl morpholine having a boiling point of 116° C. under 760 mm. Hg.

The azeotrope was then treated with soda and after decantation and distillation, 770 grams of pure N-methyl morpholine was obtained. This resulted in the production of a total of 2,180 grams of N-methyl morpholine.

The N-methyl diethanol amine chlorohydrate which was not transformed during the dehydration reaction as well as the N-methyl diethanol amine chlorohydrate formed during the neutralization or displacement reaction totaled 5,310 grams. The N-methyl diethanol amine chlorohydrate which remained in the bottom of the flask was reacidified with 0.7% hydrochloric acid (calculated at 100%) and reintroduced or recycled to the original reaction vessel for subsequent or additional reactions to form additional N-methyl morpholine. The reaction results showed.

| | G. |
|---|---|
| N-methyldiethanolamine used in the form of chlorohydrate | 3,900 |
| N-methyldiethanolamine used during neutralization | 2,700 |
| Total | 6,600 |

N-methyldiethanolamine to be recycled during a new dehydration: 3,950 g.
N-methyldiethanolamine consumed: 6,600−3,950 =2,650.
N-methylmorpholine output: 96.9%.

EXAMPLE II.—CONTINUOUS PROCESS

In this example the same procedure was followed as outlined in Example I utilizing an N-ethyl diethanol amine chlorohydrate of the following composition:

| | Percent |
|---|---|
| Pure N-ethyldiethanolamine chlorohydrate | 90.4 |
| N-ethyl-morpholine chlorohydrate | 1 |
| HCl (calculated pure) | 1.5 |
| $H_2O$ | 7 |
| Impurities | 0.1 |

The chlorohydrate was fed to the reaction vessel at a rate of 180–200 grams/hour and the temperature of the heating liquid was maintained between 190 to 192° C. The acidulated water was collected at the outlet of the cooling condenser at the rate of 24 to 27 grams/hour and the crude N-ethyl morpholine chlorohydrate was collected at the outlet of the tube at the rate of 156 to 173 grams/hour.

For 100 grams of crude N-ethyl diethanol amine chlorohydrate used, there was obtained:

| | G. |
|---|---|
| Crude N-ethyl-morpholine chlorohydrate | 86.3 |
| Water (at 2.4% HCl) | 13.5 |

The crude N-ethyl-morpholine chlorhydrate so collected had as composition (mass percentage):

| | Percent |
|---|---|
| Pure N-ethylmorpholine chlorhydrate | 60.5 |
| N-ethyldiethanolamine chlorhydrate | 36.1 |
| HCl (calculated pure) | 0.9 |
| Water | 2.4 |
| Impurities | 0.1 |

In the second stage of the process which also followed the procedure as outlined in Example I, N-ethyl diethanol amine was introduced into the reaction vessel at the rate of 56.4 grams/100 grams of crude ethyl morpholine chlorohydrate to displace the chlorine therefrom and to produce N-ethyl morpholine.

For 5,000 grams of the previously obtained N-ethyl morpholine chlorohydrate, 2,820 grams of N-ethyl diethanol amine were used. 2,395 grams of crude N-ethyl morpholine were collected resulting in a yield of 94% by weight of the pure product.

After distilling and processing the azeotrope as in Example I, 2,250 grams of pure N-ethyl morpholine having a boiling point of 138° C. at 760 mm. Hg were obtained. The reaction results showed:

|  | G. |
|---|---|
| N - ethyldiethanolamine used in the form of chlorohydrate | 4,110 |
| N-ethyldiethanolamine used during neutralization | 2,820 |
| Total | 6,930 |

N-ethyldiethanolamine to be recycled during a new dehydration: 4,220.
Consumed N - ethyldiethanolamine: 6,930—4,200 =2,730 g.
N-ethylmorpholine output: 95.3%.

EXAMPLE III.—DISCONTINUOUS PROCESS

The chlorohydrate used in the following example consisted of 92.5% by weight of pure diethanol amine chlorohydrate and 7.5% by weight water.

A three liter flask reaction vessel was equipped with a stirrer, a thermometer, a dropping funnel, an outlet tube and a cooling condenser. 1,530 grams (10 moles) of an aqueous diethanol amine chlorohydrate solution was added to the flask. The temperature of the solution was raised to 175° C. and hydrochloric acid (22° Bé.) was introduced into the flask in an amount sufficient to produce a 1% by weight free hydrochloric acid solution. The temperature in the reaction mixture was maintained between 180 and 190° C. for 12 hours and the water of dehydration collected in a graduated flask.

Water vapor was introduced into the solution to cause flashing at 100° C. and by this effect the acidulated water collected is nearly 10% of the weight of the chlorohydrate added.

1,360 grams of crude morpholine chlorohydrate was obtained and which had the following composition (weight percentage):

|  | Percent |
|---|---|
| Pure morpholine chlorohydrate | 54 |
| Diethanolamine chlorohydrate | 39.2 |
| HCl (calculated pure) | 0.7 |
| Water | 3.9 |
| Impurities | 2.2 |

The second stage of the process was carried out in accordance with the procedure set forth in Example I. The composition inside the flask was maintained at 90° C. under a reduced pressure of 200 mm. Hg. 665 grams of diethanol amine were added to neutralize, or displace, the chlorohydrate and the reaction ended at 150° C. under 20 mm. Hg.

560 grams of crude morpholine were collected which represented a yield of 90% by weight of pure product. After distillation, 505 grams of pure morpholine were obtained having a boiling point of 128° C. at 760 mm. Hg. The reaction results showed:

|  | G. |
|---|---|
| Diethanolamine used in the form of chlorohydrate | 1,050 |
| Diethanolamine used during displacement | 665 |
| Total | 1,715 |

Diethanolamine to be recycled during the ulterior dehydration: 1,050. g.
Consumed diethanolamine: 1,715—1,050=665 g.
Morpholine output: 91.6%.

EXAMPLE IV.—DISCONTINUOUS PROCESS

The chlorohydrate used in this example was a composition comprising 93% by weight diisopropanol amine chlorohydrate and 7% by weight water. The ring formation or cyclization reaction was carried out in accordance with the precedure of Example III. 1,820 grams (10 moles) of the diisopropanol amine chlorohydrate was added to the flask. The reaction mixture heated to 175° C. and acidified with hydrochloric acid at this temperature in the manner and amount as disclosed in Example III. The temperature was maintained at 180 to 190° C. for 12 hours, the water of dehydration collected and the product flashed with water vapor.

1,650 grams of crude 2,6 dimethyl morpholine chlorohydrate was obtained. The composition of the crude chlorohydrate (weight percentage) was as follows:

|  | Percent |
|---|---|
| 2,6 dimethylmorpholine chlorohydrate | 57.75 |
| Diisopropanolamine chlorohydrate | 35.25 |
| HCl (calculated pure) | 0.90 |
| Water | 3.80 |
| Impurities | 2.30 |

The second stage of the reaction was carried out utilizing the same procedure as set forth in the preceding examples. The 2,6 dimethyl morpholine was displaced from its chlorohydrate by using 920 grams of diisopropanol amine for the 1,650 grams of crude 2,6 dimethyl morpholine chlorohydrate.

760 grams of the crude 2,6 dimethyl morpholine product were collected representing a yield of 93% by weight of the pure product. After distillation, 705 grams of pure 2,6 dimethyl morpholine were obtained having a boiling point of 146° C. at 760 mm. Hg. The reaction result showed:

|  | G. |
|---|---|
| Diisopropanolamine used in the form of chlorohydrate | 1,330 |
| Diisopropanolamine used during neutralization | 920 |
| Total | 2,250 |

Diisopropanolamine to be recycled to the dehydration stage: 1,360 g.
Diisopropanolamine consumed: 2,250—1,360: 890 g.
2,6 dimethylmorpholine out: 91.6%.

EXAMPLE V

Example IV was repeated utilizing the same solution and the same quantity of diisopropanol amine chlorohydrate, but in this example the chlorohydrate solution was acidified at 40° C. with hydrochloric acid (22° Bé.) to 1.3% by weight of free hydrochloric acid (calculated at 100%) and introducing into the reaction mixture 83 grams of MgCl₂ which represents 5% by weight based on the diisopropanol amine chlorohydrate. No flashing of water vapor was carried out at the end of the dehydration.

1,750 grams of crude 2,6 dimethyl morpholine chlorohydrate were obtained having the following percent by weight composition (percent MgCl₂ deducted):

|  | Percent |
|---|---|
| Pure 2,6 dimethylmorpholine chlorohydrate | 54.7 |
| Diisopropanolamine chlorohydrate | 34 |
| HCl (calculated pure) | 0.8 |
| Water | 4.2 |
| Impurities | 6.3 |

The second stage of the reaction was carried out as set forth in Example IV. The 2,6 dimethyl morpholine was displaced from its chlorohydrate by neutralization using 920 grams of diisopropanol amine for the 1,750 grams of crude 2,6 dimethyl morpholine chlorohydrate.

740 grams of the crude 2,6 dimethyl morpholine representing a yield of 90.5% by weight of pure product were collected. After distillation, 760 grams of pure 2,6 dimethyl morpholine were obtained having a boiling point of 146° C. at 760 mm. Hg. The reaction results showed:

|   | G. |
|---|---|
| Diisopropanolamine used in the form of chlorohydrate | 1,330 |
| Diisopropanolamine used during neutralization | 920 |
| Total | 2,250 |

Consumed diisopropanolamine: 2,250—1,350: 900 g.

2,6-dimethylmorpholine output 86%.

EXAMPLE VI

In this example the same procedure was followed as set forth in Example V using the same solution and the same quantity of diisopropanol amine chlorohydrate.

1,820 grams of the aqueous solution of diisopropanol amine chlorohydrate were first added to the flask. The chlorohydrate solution was then acidified at 40° C. by hydrochloric acid (22° Bé.) 1.3% calculated pure, but no MgCl₂ was introduced. The temperature of the reaction mixture was maintained at 180–190° C. for 12 hours and the water of dehydration collected in a graduated flask. No flashing of water was done during the dehydration.

1,685 grams of crude 2,6 dimethyl morpholine chlorohydrate was obtained having a percent by weight composition as follows:

|   | Percent |
|---|---|
| Pure 2,6 dimethylmorpholine chlorohydrate | 53 |
| Diisopropanolamine chlorohydrate | 32.9 |
| HCl (calculated pure) | 0.7 |
| Water | 4 |
| Impurities | 9.4 |

The second stage of the reaction was carried out as in the preceding examples. The 2,6 dimethyl morpholine was displaced from its chlorohydrate by neutralization using 920 grams of diisopropanol amine for the 1,685 grams of crude 2,6 dimethyl morpholine chlorohydrate.

680 grams of the crude 2,6 dimethyl morpholine representing a yield of 90.2% by weight of pure product were collected. After distillation, 610 grams of pure 2,6 dimethyl morpholine were obtained having a boiling point of 146° C. at 760 mm. Hg. The reaction results showed:

|   | G. |
|---|---|
| Diisopropanolamine used in the form of hydrochlorate | 1,330 |
| Diisopropanolamine used during displacement | 920 |
| Total | 2,250 |

Diisopropanolamine to be recycled during the ulterior dehydration: 1,360 g.

Consumed diisopropanolamine: 2,250—1,360: 890 g.

2,6 dimethylmorpholine output: 79.3%.

We claim:
1. The process for preparing morpholine compounds in 2 stages comprising;
  (1) heating a chlorohydrate of an amino-alcohol having the following formula:

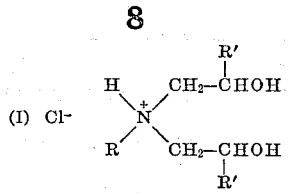

wherein R is hydrogen, methyl, ethyl, butyl, phenyl or hydroxyethyl group and R' is hydrogen or methyl in the presence of water and hydrochloric acid to cause cyclization of the amino-alcohol chlorohydrate to form the mhorpholine chlorohydrate; and
  (2) reacting the morpholine chlorohydrate formed in step (1) with an amino-alcohol of the formula

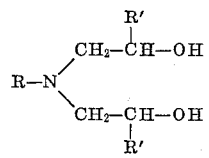

in which R and R' are the same as in Formula I in stage (1) in sufficient quantity to produce additional amino-alcohol chlorohydrate and the morpholine compound and recovering the morpholine compound therefrom.

2. The process of claim 1 in which the morpholine is recovered from stage (2) by distillation.

3. The process according to claim 1 in which the amino-alcohol chlorohydrate produced in stage (2) is recycled to the first stage for subsequent cyclization.

4. The process of claim 1 in which the quantity of hydrochloric acid added is between about 0.5 and 3 percent by weight and the quantity of water between about 4.5 and 8 percent by weight based on the weight of the amino-alcohol chlorohydrate.

5. The process according to claim 1 in which the amount of amino-alcohol used in the second stage is the stoichiometric amount necessary to react with the morpholine chlorohydrate to produce the corresponding morpholine compound, taking into account the acidity of the crude morpholine chlorohydrate.

6. The process according to claim 5 in which the amount of amino-alcohol is between about 1 and 1.05 moles per mole of the morpholine chlorohydrate.

7. The process according to claim 1 in which the stage (1) of the reaction is carried out between about 175 and 190° C.

8. The process according to claim 1 in which the amino-alcohol chlorohydrate is acidified with hydrochloric acid at the dehydration temperature and a flashing of water vapor through the reaction mixture is carried out at the end of the dehydration reaction.

9. The process according to claim 1 in which stage (2) is carried out between 90 and 150° C. and between about 200 to 10 mm. Hg.

10. The process according to claim 1 in which the cyclization stage (1) is carried out at atmospheric pressure.

No references cited.

ALEX MAZEL, Primary Examiner

J. TOVAR, Assistant Examiner

U.S. Cl. X.R.

260—247.7 A; 424—248

UNITED STATES PATENT OFFICE
CERTIFICATE OF CORRECTION

Patent No. 3,654,271  Dated April 4, 1972

Inventor(s) ARTHUR LAMENDIN, BERNARD MATEL and JEAN DHENIN

It is certified that error appears in the above-identified patent and that said Letters Patent are hereby corrected as shown below:

Column 3, line 75, "20mm Hg." should read --200mm Hg.--.

Column 8, line 12, "mhorpholine" should read --morpholine--.

Signed and sealed this 22nd day of August 1972.

(SEAL)
Attest:

EDWARD M. FLETCHER, JR.
Attesting Officer

ROBERT GOTTSCHALK
Commissioner of Patents